July 21, 1942. M. C. HANSON ET AL 2,290,471
METHOD OF AND APPARATUS FOR CONTROLLING CONCENTRATION
Filed Aug. 5, 1939 4 Sheets-Sheet 2
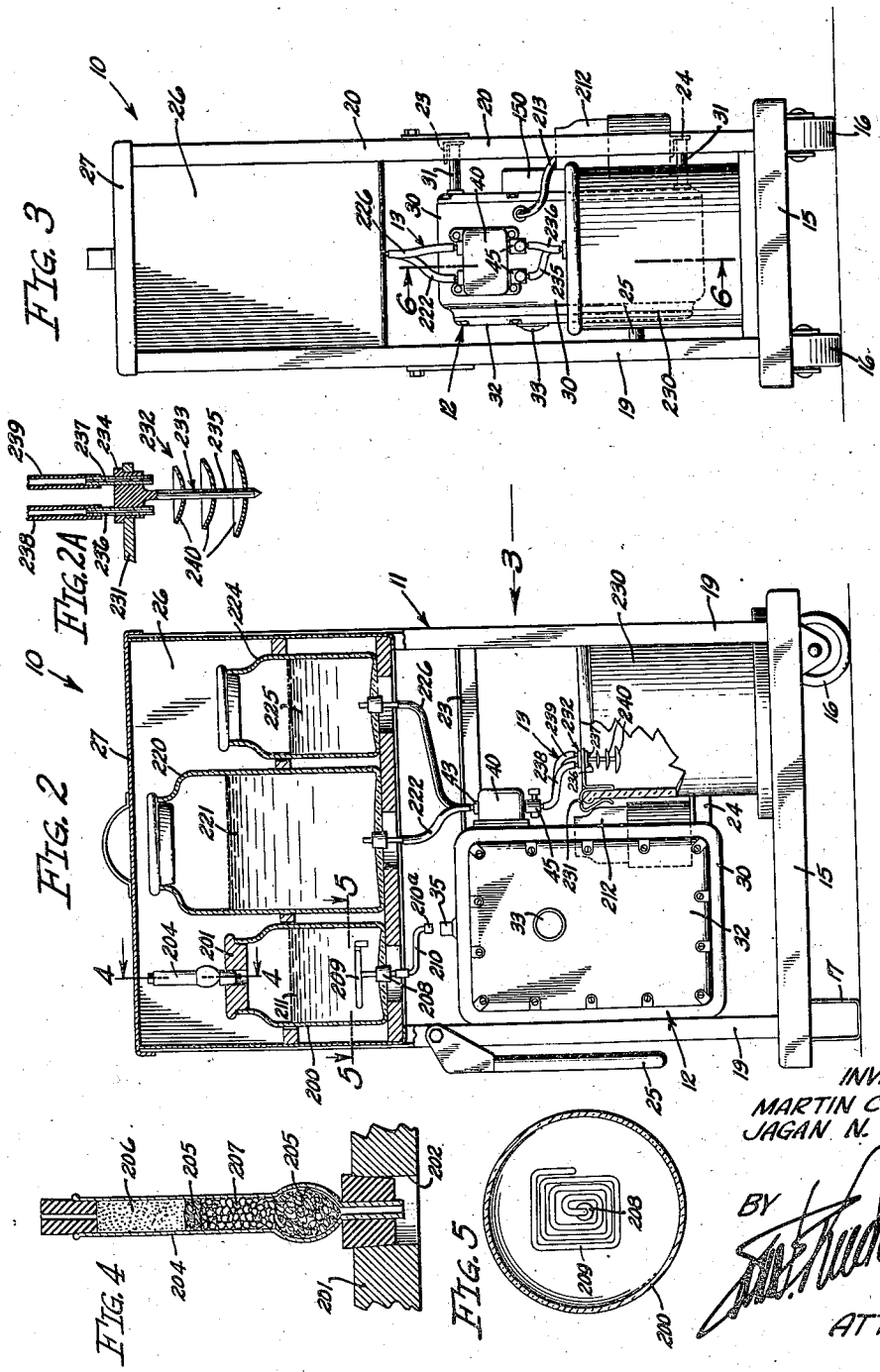
INVENTORS:
MARTIN C. HANSON
JAGAN N. SHARMA
BY
ATTORNEY

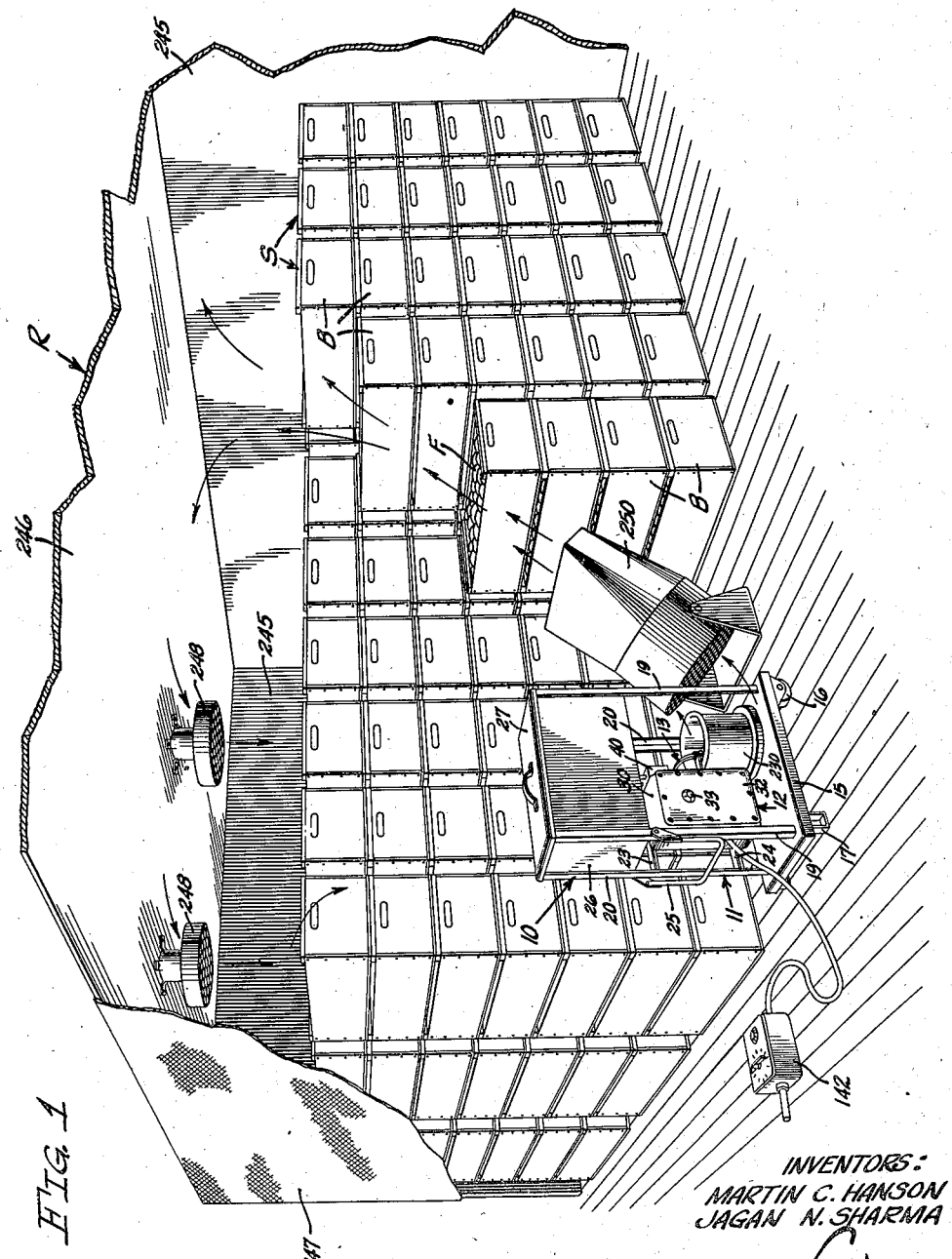

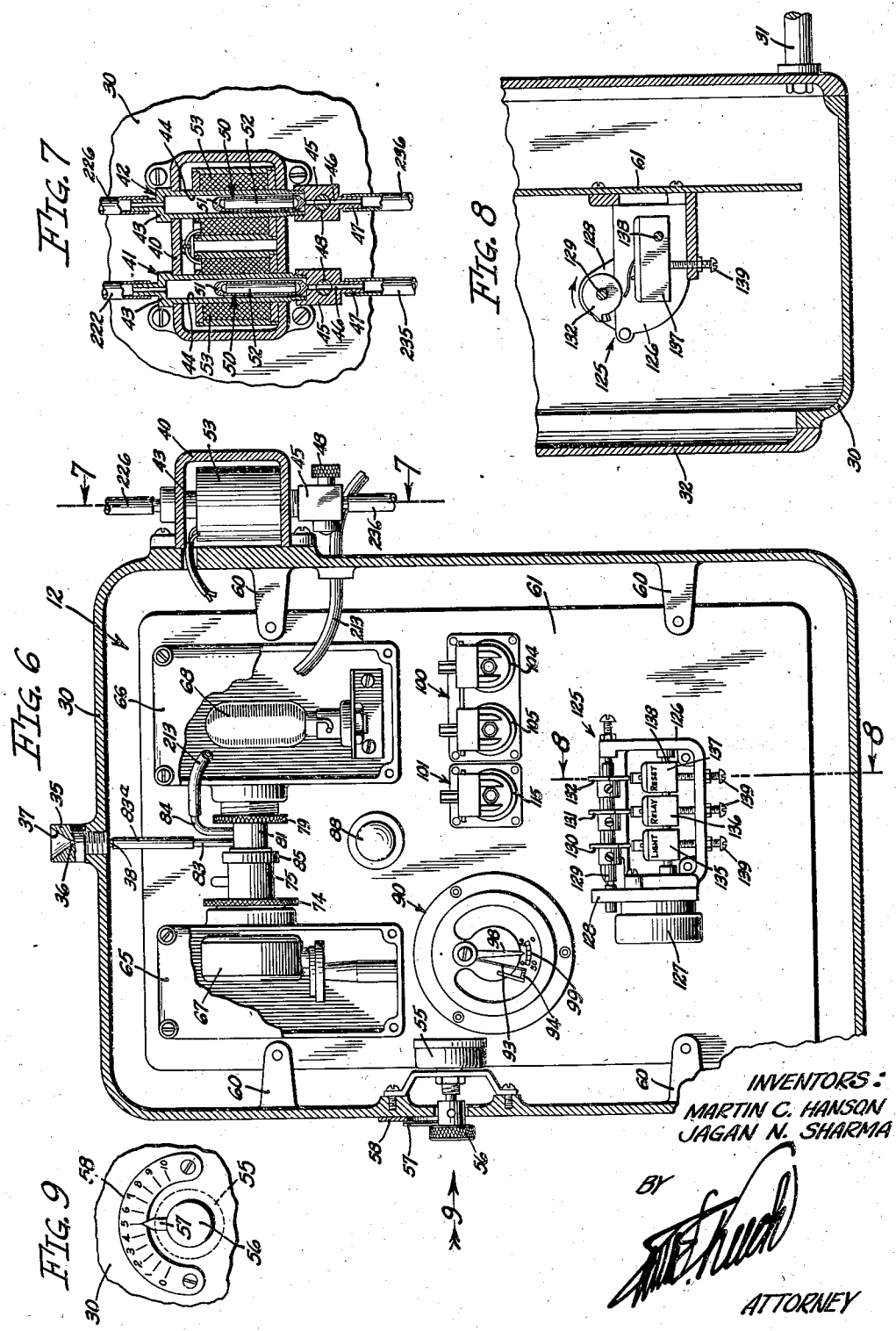

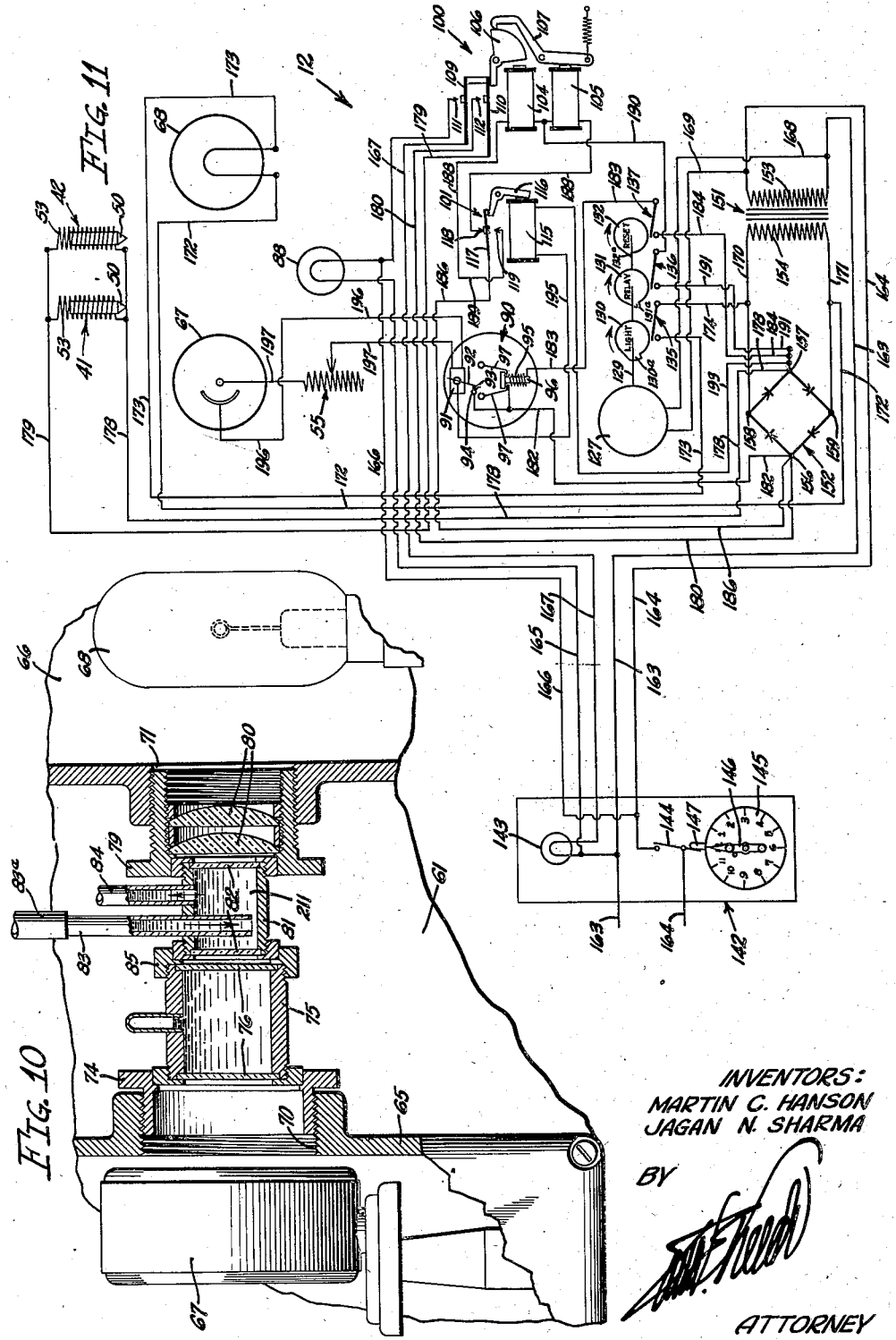

Patented July 21, 1942

2,290,471

UNITED STATES PATENT OFFICE 2,290,471

METHOD OF AND APPARATUS FOR CONTROLLING CONCENTRATION

Martin C. Hanson, Riverside, and Jagan N. Sharma, Los Angeles, Calif., assignors to Food Machinery Corporation, San Jose, Calif., a corporation of Delaware Application August 5, 1939, Serial No. 288,626

2 Claims. (Cl. 99—156)

This invention relates to the art of handling various concentrations of one material in another and has particular utility in the treating of agricultural produce with gas to retard the growth of decay organisms therein.

Extensive studies in research have been made in the effort to eliminate decay of fresh fruits and vegetables while these are being harvested, stored and shipped incidental to their being packed and marketed. Although much progress has been made in this battle to control decay organisms, a considerable portion of several important crops is still lost due to decay before the crop can be marketed. The citrus crops are particularly vulnerable to attacks of blue mold and green mold, lemons being particularly susceptible to these during the period of several months which most of the lemon crop is stored while it ripens. When taken out of this storage to pack the fruit, the lemons have to be carefully picked over and the rots separated out from the good fruit before the fruit can be packed. Even when this is done, a certain amount of contamination of the good fruit is bound to result by the powdery mold spores which sift from the infected fruit into contact with the lemons adjacent thereto.

An effective method has been developed for treating fruit in storage, without disturbing this fruit, by subjecting it to a certain concentration of fungicidal gas, each treatment covering a period of several hours and these treatments being given at such intervals throughout the period of their storage as will substantially prevent the development of decay in the fruit. This gas treatment has been expensive to use, however, because of the narrow limits within which the concentration of gas could be used so that this would effectively control the decay organisms in the fruit treated and yet not be so strong as to burn the fruit. Prior to the present invention the concentration of gas in these treatments has been maintained by an expert attendant periodically checking the concentration of gas in the room in which the treatment was being carried on and altering this concentration in accordance with his findings.

It is an object of the present invention to provide a method of and apparatus for controlling the concentration of one material in another which is adapted to be used in the treating of fresh fruits and vegetables with gas so that this can be done relatively inexpensively and with assurance that the desired action on the decay organisms will be attained and that the fruit will not be burned by an excessive concentration of gas in the atmosphere.

Another object of the present invention is the provision of a method of and apparatus for producing a gas within a closed treating chamber and controlling the production of the gas in response to the relative amount of gas in the chamber.

Other objects and advantages of the present invention will be made manifest in the following description taken in connection with the accompanying drawings, in which:

Fig. 1 is a perspective view of a fruit treating chamber, portions thereof being broken away to show the manner in which the gas generator of this invention is used.

Fig. 2 is an enlarged, front elevational view of the gas generator, portions being broken away to disclose the structure thereof.

Fig. 2A is an enlarged fragmentary view of the gas generator of our invention.

Fig. 3 is a side elevational view looking in the direction of the arrow 3 of Fig. 2.

Fig. 4 is an enlarged vertical sectional view taken on the line 4—4 of Fig. 2.

Fig. 5 is an enlarged horizontal sectional view taken on the line 5—5 of Fig. 2.

Fig. 6 is an enlarged vertical sectional view taken on the line 6—6 of Fig. 3 and showing the valve control apparatus included in the gas generator of our invention.

Figs. 7 and 8 are fragmentary, vertical sectional views taken on the lines 7—7 and 8—8 of Fig. 6.

Fig. 9 is a fragmentary view looking in the direction of the arrow 9 of Fig. 6.

Fig. 10 is an enlarged vertical sectional view through a portion of the control apparatus shown in Fig. 6.

Fig. 11 is an electrical wiring diagram of the control apparatus shown in Fig. 6.

Fig. 12 is a diagrammatic enlarged fragmentary detailed view illustrating the mode by which a testing liquid is passed through the atmosphere in the fruit treating chamber to produce a uniform partial exposure of successive portions of said liquid to said atmosphere.

Referring specifically to the drawings, a gas generator 10, comprising a preferred embodiment of the apparatus of the present invention is shown generally in Figs. 1, 2 and 3, the unit 10 including a frame 11, valve control apparatus 12 and gas generating apparatus 13.

The frame 11

The frame 11 includes a base 15 having wheels 16 and legs 17 mounted on the underside thereof. Fixed on the base 15 are pairs of front and rear corner posts 19 and 20 respectively, the latter having upper and lower horizontal angle irons 23 and 24 fixed thereto. Pivotally mounted on one pair of the posts 19 and 20 is a handle 25 and supported on upper portions of the posts 19 and 20 is a box 26 having a removable cover 27.

The valve control apparatus 12

The valve control apparatus 12 includes a housing 30 supported as shown in Fig. 3, by brackets 31 mounted on the horizontal angle irons 23 and 24. Provided on the front side of the housing 30 is a cover plate 32 having a jewel 33 mounted thereon. Threaded into the upper wall of the housing 30, as seen in Fig. 6, is a funnel 35 having a central bore 36, a conical depression 37 at its upper end and a nipple 38 extending from the lower end thereof. Provided on one side of the housing 30 is a case 40 containing a pair of electrically operated valves 41 and 42. Each of the valves 41 and 42, shown in Fig. 7, includes a central tube 43 having a bore 44, the tubes 43 being formed of a corrosion-resisting material such as hard rubber. Threaded onto the lower end of each of the tubes 43 is a stop cock 45 having a central bore 46 and a nipple 47. Extending transversely through each of the stop cocks 45 is a manually operable valve cylinder 48. Movable vertically within the bore 44 of each of the tubes 43 is a valve plunger 50, the latter comprising a hollow glass cylinder 51 having an iron core 52 therein. As shown in Fig. 7, the plungers 50 fit loosely within the bores 44 and have ground, conical points at their lower ends which fit on ground seats in the stop cocks 45 so as to close the bores 46 thereof when the plungers 50 are in their lowermost positions. Surrounding each of the tubes 43 is a solenoid 53, the latter, when electrically energized, raising the plungers 50 to permit liquid to flow through the tubes 43 as described hereinafter.

Mounted at one side of the housing 30, as shown in Fig. 6, is a potentiometer 55 adjustable by means of a knob 56 having a pointer 57 registering with a segmental, graduated dial 58 fixed on the housing 30 as shown in Fig. 9.

Supported within the housing 30 (see Fig. 6) by lugs 60 is a panel 61 upon which the various electrical elements for controlling the valves 41 and 42 are mounted. Provided on the upper portion of the panel 61 is a pair of housings 65 and 66, the former containing a conventional photo-electric cell 67 and the latter having an electric exciter lamp 68 mounted therein. As seen in Fig. 10, the innermost walls of the housings 65 and 66 are formed to provide aligned, threaded openings 70 and 71 respectively. Screwed into opening 70 is a collar 74 adapted to support one end of a light filter cell 75 having glass end walls 76 and being filled with a solution of copper sulphate. Threaded into the opening 71 of the housing 66 is a collar 79 having a pair of lenses 80 mounted therein. Supported at one end thereof by the collar 79 is a scanning cell 81 having glass end walls 82 and inlet and outlet tubes 83 and 84 respectively, the tube 83 being connected to the nipple 38 of the funnel 35 by a rubber tube 83a. Threaded on one end of the filter cell 75 and counterbored to receive the adjacent end of the scanning cell 81 is a ring 85.

Mounted on the panel 61 between the housing 65 and 66 is a pilot light 88 positioned to illuminate the jewel 33 in a manner to be described hereinafter.

Fixed on the panel 61 below the housing 65 is a "micro-amp" relay 90 similar to the device disclosed in U. S. Patent No. 2,062,915 issued Dec. 1, 1936, to A. H. Lamb. The relay 90, shown diagrammatically in Fig. 11 of applicants' drawings, includes a moving coil 91 to which an oscillating switch arm 92 is fixed, the latter having a permanently magnetized contact 93 thereon. Positioned for engagement with the contact 93 of the arm 92 is a stationary permanently magnetized contact 94, the arm 92 being normally urged into engagement with the contact 94 as shown in Figs. 6 and 11 by a hair-spring (not shown). Also provided in the relay 90 is a solenoid 95 having a vertically movable core 96 for actuating a pair of fingers 97 as described hereinafter. As shown in Fig. 6, a pointer 98 is provided in the relay 90 for registration with graduations 99. The pointer 98 normally remains stationary and is adjustable manually to increase or decrease the tension exerted on the switch arm 92 by the aforementioned hair-spring.

Mounted on the panel 61 is a double coil, interlocking relay 100 and a single coil, control relay 101, these being shown diagrammatically in Fig. 6. The interlocking relay 100 includes coils 104 and 105, the coil 104 operating a pivoted lever 106 and the coil 105 actuating a latch lever 107. Operated by the lever 106 is a double switch having arms 109, 110 and stationary contacts 111 and 112. The control relay 101 includes a coil 115 for actuating a lever 116, the latter operating a switch arm 117 having stationary contacts 118 and 119 provided on opposite sides thereof.

Mounted on the lower portion of the panel 61 as shown in Fig. 6 is a motor driven switch mechanism 125 including a frame 126 having a synchronous electric motor 127 mounted thereon. Driven by the motor 127 through a speed reduction transmission 128 is a cam shaft 129, the latter being driven at ⅓ R. P. M. Fixed on the shaft 129 are cams 130, 131 and 132 having lobes 130a, 131a and 132a respectively as best shown in Fig. 11. Below the cams 130, 131 and 132 are "micro-switches" 135, 136 and 137, these being pivoted on a rod 138 and adjustable by means of screws 139.

As shown in Fig. 1, a control box 142 is provided for controlling the supply of current to the valve control apparatus 12 of the gas generator 10. The box 142, as shown diagrammatically in Fig. 11, includes a pilot light 143 and a time-controlled switch 144, the latter being automatically opened as described hereinafter by a clock mechanism 145 having a pointer 146 and switch actuating arm 147.

Mounted on the back side of the housing 30 as shown in Fig. 3 is a housing 150 containing a transformer 151 and a rectifier 152 as diagrammatically shown in Fig. 11. The transformer 151 comprises a primary, high voltage coil 153 and a secondary, low voltage coil 154. The rectifier 152 includes direct current terminals 156 and 157 and alternating current terminals 158 and 159.

The electrical system of the valve control apparatus 12, as shown in Fig. 11, includes four separate circuits: a 110 v.—A. C. circuit obtained from a suitable source of supply; a 10 v.—A. C. circuit obtained from the transformer 151; a 10 v.—D. C. circuit obtained from the rectifier 152;

and a "micro-amp" circuit generated by the photo-electric cell 67, these four circuits being now described in the order above named.

The elements energized by the 110 v. circuit include the pilot lights 88 and 143, the motor 127 and the primary coil 153 of the transformer 151. The 110 v. current is supplied from any suitable source to the apparatus 12 by lead wires 163 and 164 which lead to the coil 153 of the transformer 151, the wire 164 being interrupted by the switch 144 of the control box 142. Connected to and extending from the lead wire 163 to one terminal of each of the pilot lights 88 and 143 is a wire 165. The circuit to the pilot light 88 is completed by a wire 166 extending from the lead 164 to the remaining terminal of the light 88 and on to the stationary contact 111 of the relay 100, the light 88 being illuminated whenever the switch 144 is closed. The light 88 illuminates the jewel 33 to indicate when the timing switch 144 is closed. Extending from the remaining terminal of the pilot light 143 to the switch arm 109 of the relay 100 is a wire 167. Extending from the lead wires 163 and 164 to the motor 127 are wires 168 and 169 respectively.

The elements of the 10 v. A. C. circuit discharged by the secondary coil 154 of the transformer 151 are the rectifier 152 and the exciter lamp 68. Connecting opposite ends of the coil 154 with the terminals 158 and 159 of the rectifier 152 are wires 170 and 171 respectively and extending from the wire 171 to one terminal of the exciter lamp 68 is a wire 172, the remaining terminal of the lamp 68 being connected by a wire 173 to the micro-switch 135, the latter being joined by a wire 174 with the wire 170 of the 10 v. A. C. circuit.

The elements of the apparatus 12 energized by the 10 v. D. C. circuit include the solenoids 53 of the valves 41 and 42, the solenoid 95 of the "micro-amp" relay 90, the coil 115 of the relay 101 and the coils 104 and 105 of the relay 100. Connecting one end of each of the valve solenoids 53 with the terminal 157 of the rectifier 152 is a wire 178, the opposite ends of the solenoids 53 being connected to the switch arm 110 of the relay 100 by a wire 179. The circuit to the valve solenoids 53 is completed by a wire 180 extending from the terminal 156 of the rectifier 152 to the stationary contact 112 of the relay 100, the latter serving to energize the valve solenoids 53 in a manner described hereinafter. Connected to the terminal 156 of the rectifier 152 is a wire 182, the latter leading to the contact 94 of the relay 90 and to one end of the solenoid 95 of the relay 90. The opposite end of the solenoid 95 is connected to a wire 183 which extends to one terminal of the cam-operated switch 137, the other terminal of the latter being joined with the terminal 157 of the rectifier 152 by a wire 184. The 10 v. D. C. circuit from the rectifier 152 to the coils 104 and 105 of the relay 100 includes a wire 186 extending from the terminal 156 of the rectifier 152 to the switch arm 117 of the relay 101. Connecting the stationary contacts 118 and 119 of the relay 101 with one end of each of the coils 104 and 105 of the relay 100 are wires 188 and 189 respectively, the opposite ends of the coils 104 and 105 being jointly connected to a wire 190 extending to one terminal of the cam-operated switch 136, the other terminal of the latter being joined by a wire 191 with the terminal 157 of the rectifier 152. Connected to one end of the coil 115 of the relay 101 is a wire 194, the latter leading to the terminal 157 of the rectifier 152, the opposite end of the coil 115 being joined to the switch arm 92 of the relay 90 by a wire 195. The position of the switch arm 117 of the relay 101 determines which of the two coils 104 and 105 is to be energized by the 10 v.—D. C. circuit as hereinafter described.

The "micro-amp" circuit between the photoelectric cell 67 and the relay 90 as seen in Fig. 11, comprises a pair of wires 196 and 197 leading to the moving coil 91 of the relay 90, the wire 197 embracing the potentiometer 55.

Included in the valve control apparatus 12 is a jar 200 provided in the box 26 as shown in Fig. 2. The mouth of the jar 200 is closed by an airtight cover 201 having a hole 202 formed therethrough. Mounted in the hole 202 is a gas filtering tube 204 containing layers of glass wool 205, charcoal 206 and granules 207 of mixed potassium iodide and starch. Supported by a stopper 208 at the bottom of the jar 200 is a capillary tube 209, the lower end 210 thereof being disposed above the funnel 35 as shown in Fig. 2, and closed by a removable cap 210a when the unit 10 is not in use. The upper portion of the tube 209 is coiled as shown in Fig. 5 so as to provide a substantial length of tubing in a relatively small space. The jar 200 is filled with a solution 211 such as orthotolidine which darkens in color when subjected to chlorine containing gases as described hereinafter.

Mounted on the horizontal frame member 24, as seen in Figs. 2 and 3 is a container 212 for receiving the solution 211 after the latter passes from the scanning cell 81 through the outer tube 94, a rubber tube 213 shown in Figs. 3 and 6 being provided to conduct the solution into the container 212.

*The gas generating apparatus 13*

The gas generating apparatus 13 includes a jar 220 positioned in the box 26 as shown in Fig. 2, this jar containing a solution 221 of an alkaline hypochlorite such as sodium hypochlorite. Extending from the bottom of the jar 220 is a tube 222 for conducting the solution 221 to the valve 41 within the housing 40 (see Fig. 7). Adjacent the jar 220 is a smaller jar 224 containing hydrochloric acid 225, the latter being conducted to the valve 42 by a tube 226. The volume of the jar 224 is approximately half that of the jar 220 as one part of acid and two parts of hypochlorite are required to produce hypochlorous acid gas.

Provided on the base 15, as shown in Figs. 2 and 3 is a crock 230 having a spring bracket 231 slipped over the upper edge thereof. Supported by the bracket 231 (see Figs. 2 and 2A) is a chemical mixer 232 including a non-corrosive body 233 comprised of a head 234 and stem 235. Extending through the head 234 are capillary tubes 236 and 237, these being connected with the cocks 44 of the valves 41 and 42 by rubber tubes 238 and 239. The bore of the capillary tube 236 is larger than the bore of the tube 237 in order to feed the solutions 221 and 225 in the aforementioned proportion of two-to-one. Provided on the stem 235 of the body 233 is a series of rubber dishes 240 increasing in diameter from top to bottom, for receiving and mixing the liquids dropping from the tubes 236 and 237.

*Operation*

The gas generator 10 of our invention may be used in gassing fruits in various types of enclosed chambers, the most common of these being gassing rooms especially built in packing houses for this purpose, and box cars in which the fruit has been loaded for shipment. Fig. 1 diagrammatically illustrates the gassing of fruit by the apparatus 10 in a specially built gassing room as are commonly provided in fruit packing houses. This gassing room R has walls 245, a ceiling 246 and a removable side wall formed by a canvas flap 247. Mounted on the ceiling 246 are fans 248, two of which are preferably provided at each side of the room R. The fruit to be treated is stored in room R in stacks S of field boxes which are preferably arranged in spaced relation to permit circulation of the treating gas to the lowermost boxes in the stacks. In arranging the fruit in the room R, a space is left in the stacks of the boxes to accommodate the generator 10 and a portable blower 250.

The blower 250 is provided to thoroughly mix the gas produced by the generator 10 with the air in the room R. As this gas is generally heavier than air, the blower 250 functions to best advantage in picking up the air and gas located close to the floor at a point adjacent the generator 10 and directing this upwardly toward the ceiling.

After everything has been arranged as shown in Fig. 1 for gassing a room full of fruit, the generator 10 is set in operation and the fans 248 and blower 250 started. After this is done, the canvas wall 247 may be lowered and the generator 10 will automatically gas the fruit in the room R for a predetermined period of time, maintaining a substantially uniform concentration of gas in the room and at the end of this period will automatically cease operation.

Before describing the operation of the generator 10 in detail, this operation will be briefly outlined as follows:

To set the gas generator 10 in operation, the operator rotates the pointer 146 of the clock mechanism 145 in a clockwise direction (see Fig. 11) until this pointer indicates on the face of the clock the number of hours which it is desired that the generator continue in operation to maintain a given concentration of gas in the room R. This closes the circuit as will be described hereinafter, which energizes the valve control apparatus 12. At the same time that the clock mechanism is thus set, the operator removes the cap 210a from the lower end 210 of the tube 209 to permit the orthotolidine solution 211 to feed from the jar 208 through the capillary tube 209 and to drop slowly into the funnel 35 shown in Fig. 6. As the drops of orthotolidine form at the lower extremity 210 of the tube 209 and drop into the funnel 35, as shown in Fig. 12, the drops are exposed to the atmosphere in the room R and are darkened in color while thus exposed, in direct proportion to the concentration of the fruit treating gas in the atmosphere. After the scanning cell 81 has become filled with orthotolidine, this escapes therefrom through the tubes 84 and 213 from whence it flows into the container 212 shown in Figs. 2 and 3.

The apparatus 10 includes a mechanism which lights the exciter lamp 68 for short periods preferably about ten seconds in length and spaced apart at regular intervals of preferably about three minutes each, in a manner to be described hereinafter. While the lamp 68 is thus lighted, a portion of the light produced thereby passes through the cell 81 and the light filter 75 and impinges upon the photo-electric cell 67. The portion of light which thus reaches the photo-electric cell varies in inverse proportion to the darkness of the color of the solution 211 within the scanning cell 81. As the darkness of the color of the solution 211 within this cell varies in direct proportion to the concentration of gas in the atmosphere surrounding the generator 10, the amount of light reaching the photo-electric cell 67 when the exciter lamp 68 is lighted, is thus seen to be inversely proportional to the concentration of gas in the atmosphere. It is thus possible, by the reaction of the photo-electric cell to the amount of light reaching it during each period that the lamp 68 is excited, to exercise a control function which is accurately and directly related to the concentration of gas in the atmosphere.

In the apparatus 10, the photo-electric cell 67 is employed for controlling the production of gas by the gas generating apparatus 13. This control is exercised upon each excitement of the lamp 68 to do one of three things: first, either to start the gas generating apparatus 13 generating gas; or, second, to cause the generating apparatus 13 to stop generating gas; or, third, to maintain the status quo.

The production of gas by the gas generating apparatus 13 results from the mixing of portions of the gas forming liquids 221 and 225 which are permitted to pass through the valves 41 and 42 and discharge downwardly over the mixing discs 240. The production of gas is thus started by opening the valves 41 and 42 and stopped by closing these valves. These valves are controlled so as to start, stop or maintain the production of gas as aforesaid during each ten-second period, so that when the concentration of gas within the room R exceeds the predetermined maximum, the valves 41 and 42 are closed, thereby stopping the generation of gas, and so that when the gas concentration falls below a predetermined minimum, the valves 41 and 42 are opened to start the production of gas and so that when the gas concentration in the room R is between said maximum and minimum the gas generating apparatus 13 is permitted to stay as it was, whether it was generating or not generating gas.

Passing now to a more detailed description of the operation of the generator 10, it will be assumed that the pointer 146 of the clock mechanism 145 has been set in a clockwise direction as already described until this pointer indicates, on the face of the clock, the number of hours which it is desired that the generator function before automatically shutting down. When the pointer 146 is thus moved, the arm 147 moves out of engagement with the switch 144 allowing the latter to close, thus energizing the valve control apparatus 12. As soon as the switch 144 is closed, the pilot light 88 lights, indicating that the apparatus 12 is energized and the motor 127 starts and drives the shaft 129 continuously at ⅓ R. P. M.

The cams 130, 131 and 132 on the cam shaft 129 rotate one revolution every three minutes in the direction indicated by the arrows thereon in Fig. 11, and the lobes 130a, 131a and 132a of the cams momentarily close the switches 135, 136 and 137, respectively, during each revolution of the cams.

As shown in Fig. 11, the lobe 130a of the cam 130 is larger than the lobes 131a and 132a causing the switch 135 to close prior to the switches 136 and 137 and to remain closed longer than the latter two. Closing the switch 135 closes the 10 v. A. C. circuit to the exciter lamp 68 which throws a beam of light through the scanning cell 81, filter cell 75 and into the photo-electric cell 67, the latter discharging electrical current and energizing the moving coil 91 of the relay 90.

Immediately after the lamp 68 is lighted by the closing of the switch 135 by the cam 130, the switch 137 is momentarily closed by the cam 132 to reset the switch arm 92 of the "micro-amp" relay 90. Closing of the switch 137 closes the 10 v. D. C. circuit from the rectifier 152 to the solenoid 95 of the relay 90 causing the core 96 to swing the fingers 97 inward, the latter centralizing the switch arm 92 and releasing it as soon as the switch 137 is permitted to open.

When the moving coil 91 is energized by current from the photo-electric cell 67, the coil 91 tends to swing the switch arm 92 rightward away from the magnetic contact 94 against the influence of the aforementioned hair-spring (not shown). When the gas concentration in the room R is below the aforesaid minimum, the orthotolidine solution in the cell 81 is relatively clear, thus allowing a substantial amount of light to pass from the lamp 68 to the photo-electric cell 67. The current generated by the photo-electric cell 67 is thus sufficient to cause the moving coil 91 of the relay 90 to maintain the switch arm 92 out of engagement with the contact 94 thus breaking the circuit to the coil 115 of the relay 101 and permitting the switch arm 117 of the latter to remain in engagement with the contact 119. When the switch arm 117 is in this position, the circuit is closed through the wire 189 to the coil 104 of the relay 100 and when the cam-operated switch 136 is closed by the cam 131 the circuit from the rectifier 152 to the relay 100 is completed to energize the coil 104. The coil 104 moves the lever 106 which lifts the switch arms 109 and 110 upward against the contacts 111 and 112 closing the circuits to the pilot light 143 and the solenoids 53 of the valves 41 and 42, the plungers 50 of the latter being lifted by the magnetism of the coils 53 allowing the hypochlorite 221 and acid 225 to flow into the tubes 222 and 226 respectively and into the mixing dishes 238 where the gas is formed.

The lever 106 of the relay 100 is retained in operative position after the circuit to the coil 104 is broken by the latch lever 107 in order to maintain the valves 41 and 42 in open position. At three-minute intervals, the switches 135, 136 and 137 are actuated by the cams 130, 131 and 132 respectively, and as long as the concentration of gas in the room R is less than the aforesaid minimum, the apparatus 12, upon each such actuation, operates in the same manner as above described to retain the valves 41 and 42 in open position.

When the concentration of gas in the room R exceeds the aforesaid maximum, the production of gas by the generator 10 is stopped in the following manner: When the orthotolidine darkens in color beyond a given point, indicating that the proportion of gas in the room R has exceeded the maximum concentration desired, the amount of light received by the photo-electric cell 67 from the exciter lamp 68 is reduced causing a proportional reduction in the amount of current generated by the cell 67. When the switch arm 92 of the relay 90 is again centralized and released by the fingers 97 in response to momentary closing of the switch 137, insufficient current is received by the moving coil 91 to overcome the force exerted on the switch arm 92 by the aforementioned hair-spring and the arm 92, upon being released, swings to the position in which it is shown in Fig. 11 with the contacts 93 and 94 in engagement. Engagement of the contacts 93 and 94 closes the circuit from the rectifier 152 to the coil 115 of the relay 101 so as to actuate the lever 116 and move the switch arm 117 into engagement with the contact 118, thus joining the wires 186 and 188 enabling the coil 105 of the relay 100 to be energized when the switch 136 is closed by the cam 131. When the coil 105 is thus energized, the latch lever 107 is moved out of engagement with the lever 106 causing the switch arms 109 and 110 to move downward away from the contacts 111 and 112 so as to break the circuits to the pilot light 143 and valves 41 and 42, the latter stopping the flow of the gas forming liquids 221 and 225.

During the entire period of treatment of the fruit in the room R, the control apparatus 12 of the generator 10 checks the concentration of gas every three minutes in the manner above described, thus insuring a sufficient concentration of gas to effectively treat the fruit and preventing such a concentration of gas as would injure the fruit.

The potentiometer 55 is provided to permit adjusting the control apparatus 12 to vary the concentration of gas produced thereby. Adjustment of the potentiometer 55 (see Fig. 11) regulates the amount of current permitted to pass from the photo-electric cell 67 to the "microamp" relay 90.

The hypochlorous acid gas formed by the generator 10 is considerably heavier than air and the function of the blower 250 is to blow the gas from the vicinity of the generator 10 to the upper portion of the room R to permit the gas to settle down between the stacks S or be blown down by the ceiling fans 248. It is also noted that if the gas were not drawn from the generator 10 the orthotolidine solution would soon become darkened so as to stop the generation of gas before the room R is uniformly provided with the desired concentration of gas.

When the pointer 146 of the clock mechanism 145 returns to the position in which it is shown in Fig. 11 at the termination of the gassing period, the switch 144 is automatically opened so as to stop the operation of the generator 10.

The herein disclosed method and apparatus, while particularly useful in treating citrus fruits as specifically disclosed, is equally capable of broad application to edible or fresh farm or agricultural products of all kinds as contemplated in the specification. Therefore the term "fruit" as used in the claims is not to be construed as limiting the claims to any particular type of edible product.

We claim as our invention:

1. In a method of treating fruit by subjecting the same to contact with controlled concentration of liberated gas within the atmosphere of a closed chamber, the steps of controlling said gaseous concentration comprising passing relatively small increments of a liquid testing agent capable of color reaction by contact with said gas through the gaseous atmosphere in said chamber at a uniform rate to effect a substantially uniform exposure of said liquid increments to said atmosphere for a predetermined time whereby said reaction varies the capacity of said agent, collecting said exposed liquid increments and confining the same from further contact with said gaseous atmosphere, photo-electrically testing the opacity of said collected and confined liquid to determine the degree of gas concentration in said chamber, and varying said concentration in accordance with said test.

2. In a method of treating fruit by subjecting the same to contact with controlled concentration of liberated gas within the atmosphere of a closed chamber, the steps of controlling said gaseous concentration comprising passing by gravity relatively small increments of a liquid testing agent capable of color reaction by contact with said gas through the gas permeated atmosphere in said chamber at a uniform rate to effect a substantially uniform exposure of said liquid increments to said atmosphere for a predetermined time, collecting said exposed liquid increments and confining the same against further contact with said gaseous atmosphere, maintaining said collected and confined liquid in a pool of substantially uniform size by providing an overflow therefrom, photo-electrically detecting at predetermined intervals the degree of opacity to light of said pool of collected confined liquid by reason of its change in color to determine the degree of gas concentration in said chamber, and controlling the liberation of gas to the chamber atmosphere in accordance with the concentration thereof as thus detected, whereby to maintain the liberated fruit treating gas in said chamber within predetermined limits.

MARTIN C. HANSON.
JAGAN N. SHARMA.